United States Patent
Suyama et al.

(10) Patent No.: US 7,460,121 B2
(45) Date of Patent: Dec. 2, 2008

(54) MULTIDIMENSIONAL DATA DISPLAY PROGRAM

(75) Inventors: Akihiro Suyama, Tokyo (JP); Tomoko Murakami, Kanagawa (JP); Shigeaki Sakurai, Tokyo (JP); Ryohei Orihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/797,939

(22) Filed: May 9, 2007

(65) Prior Publication Data
US 2007/0211060 A1   Sep. 13, 2007

Related U.S. Application Data

(63) Continuation of application No. 11/210,961, filed on Aug. 25, 2005, now Pat. No. 7,283,137.

(30) Foreign Application Priority Data

Aug. 25, 2004   (JP) ............... P2004-245358

(51) Int. Cl.
G06T 11/20       (2006.01)
G06F 7/00        (2006.01)
G06F 17/00       (2006.01)

(52) U.S. Cl. ..................... 345/440; 707/102
(58) Field of Classification Search ............... 345/440; 707/102
See application file for complete search history.

(56) References Cited

U.S. PATENT DOCUMENTS 5,452,410 A   9/1995   Magidson
5,675,760 A   10/1997  Houwen et al.
6,301,579 B1  10/2001  Becker

FOREIGN PATENT DOCUMENTS

| JP | 54-161245 | 12/1979 |
|---|---|---|
| JP | 06-274387 | 9/1994 |
| JP | 07-105392 | 4/1995 |
| JP | 07-210699 | 8/1995 |
| JP | 11-316766 | 11/1999 |
| JP | 11-338344 | 12/1999 |
| JP | 2000-293281 | 10/2000 |
| JP | 2001-273315 | 10/2001 |
| JP | 2002-183177 | 6/2002 |

OTHER PUBLICATIONS

Japanese Patent Office Action mailed on Jul. 1, 2008, regarding counterpart Japanese application No. 2004-245358.

*Primary Examiner*—M Good Johnson
(74) *Attorney, Agent, or Firm*—Finnegan, Henderson, Farabow, Garrett & Dunner LLP

(57) ABSTRACT

A method for displaying multidimensional data on a screen of a display device, includes assigning a first dimension element, having been selected by a user from among the multidimensional data, to an axis; giving weights to a plurality of member regions using a function of number of data belonging to respective members of the first dimension element; defining the weighted member regions as a plurality of regions on the axis, which are partitioned for the respective members of the first dimension element; arranging the weighted member regions within the screen to form a table; and displaying, in each cell region corresponding to the weighted member region, data belonging to each cell region and belonging to a second dimension element having been selected by the user from among the multidimensional data. The second dimension element is different from the first dimension element.

2 Claims, 9 Drawing Sheets

MULTIDIMENSIONAL DATA DISPLAY PROGRAM

This is a continuation of U.S. Patent Application Ser. No. 11/210,961, entitled "Multidimensional Data Display Apparatus, Method, and Multidimensional Data Display Program," filed Aug. 25, 2005, by Akihiro Suyama et al., now issued as U.S. Pat. No. 7,283,137, which application is hereby incorporated by reference.

BACKGROUND OF THE INVENTION

1. Field of the Invention

The invention relates to multidimensional data display apparatus, a method for displaying a multidimensional data and a multidimensional data display program, suitable for analyzing multidimensional data.

2. Description of the Related Art

It is desired that more dimensions can be confirmed visually at one time in analysis for discovering segments regarded as promising from multidimensional data, for example, in customer's market analysis for marketing. A three-dimensional display method in which dimensional data of two dimensions are selected as axes from multidimensional data, and number of data is displayed in each cell region formed by the axes disposed orthogonally has been known as a display method capable of listing multidimensional data. Display methods capable of listing more dimensions have been also proposed. One of the display methods is a method in which dimensional data of another dimension is further used as an axis, and XY table representations sliced by members belonging to this axis are arranged to increase the dimensions by one artificially. Another one of the display methods is a method in which each cell region of an XY table is colored in accordance with number of data belonging thereto so that a result of analysis of dimensional data of another dimension is expressed in the cell region. Further, there has been also known a display method like a three-dimensional scatter diagram in which data are expressed by dots in an XYZ space where three dimensions selected from multidimensional data are disposed orthogonally with respect to one another (for example, see JP 2000-293281 A). In addition, there has been also proposed a display method for supporting a data analysis work with two kinds of manners of hypothesis finding and hypothesis testing linked complementarily in data analysis for multidimensional data (for example, see JP 2001-273315 A).

BRIEF SUMMARY OF THE INVENTION

However, in a numeric value display method according to the aforementioned prior art for representing the number of data in each of cell regions based on member regions displayed at even intervals or a diagram display method according to the aforementioned prior art, using a scatter diagram or the like, numeric values or diagrams shown in the cell regions have to be confirmed individually to compare the number of data in one cell region with that in another. Accordingly, it is difficult to see the number of data in each cell region instantaneously. Thus, there arises a problem that the comparison of the number of data is not easy.

The invention provides a multidimensional data display apparatus, a method for displaying multidimensional data and a multidimensional data display program, in which the number of high-dimensional data is visualized so that the features of the number of data in each cell region can be grasped easily.

According to one embodiment of the invention, a method for displaying multidimensional data on a screen of a display device, includes assigning a first dimension element, having been selected by a user from among the multidimensional data, to an axis; giving weights to a plurality of member regions using a function of number of data belonging to respective members of the first dimension element; defining the weighted member regions as a plurality of regions on the axis, which are partitioned for the respective members of the first dimension element; arranging the weighted member regions within the screen to form a table; and displaying, in each cell region corresponding to the weighted member region, data belonging to each cell region and belonging to a second dimension element having been selected by the user from among the multidimensional data. The second dimension element is different from the first dimension element.

According to one embodiment of the invention, a multidimensional data display apparatus is connected to a database storing multidimensional data. The apparatus includes an input device, a display device, a selecting unit, an assigning unit, a weighting unit, a setting unit, an arranging unit, and a cell region displaying unit. A user inputs an instruction through the input device. The selecting unit selects a first dimension element and a second dimension element from the multidimensional data. The first dimension element is different from the second dimension element. The assigning selection assigns the first dimension element to an axis. The weighting unit gives weights to a plurality of member regions using a function of number of data belonging to respective members of the first dimension element. The setting unit sets the weighted member regions as a plurality of regions on the axis, which are partitioned for the respective members of the first dimension element. The arranging unit arranges the weighted member regions within the screen to form a table. The cell region displaying unit displays, in each cell region corresponding to the weighted member region, data belonging to each cell region and belonging to the second dimension element.

According to one embodiment of the invention, a multidimensional data display program causes a computer controlling a display device to execute a process. The process includes assigning a first dimension element, having been selected by a user from among the multidimensional data, to an axis; giving weights to a plurality of member regions using a function of number of data belonging to respective members of the first dimension element; defining the weighted member regions as a plurality of regions on the axis, which are partitioned for the respective members of the first dimension element; arranging the weighted member regions within the screen to form a table; and displaying, in each cell region corresponding to the weighted member region, data belonging to each cell region and belonging to a second dimension element having been selected by the user from among the multidimensional data. The second dimension element is different from the first dimension element.

According to the invention, it is possible to provide a multidimensional data display apparatus, a method for displaying multidimensional data and a multidimensional data display program, in which number of high-dimensional data is visualized so that features of the number of data in each cell region can be grasped easily.

DETAILED DESCRIPTION OF THE INVENTION

Figure 1:
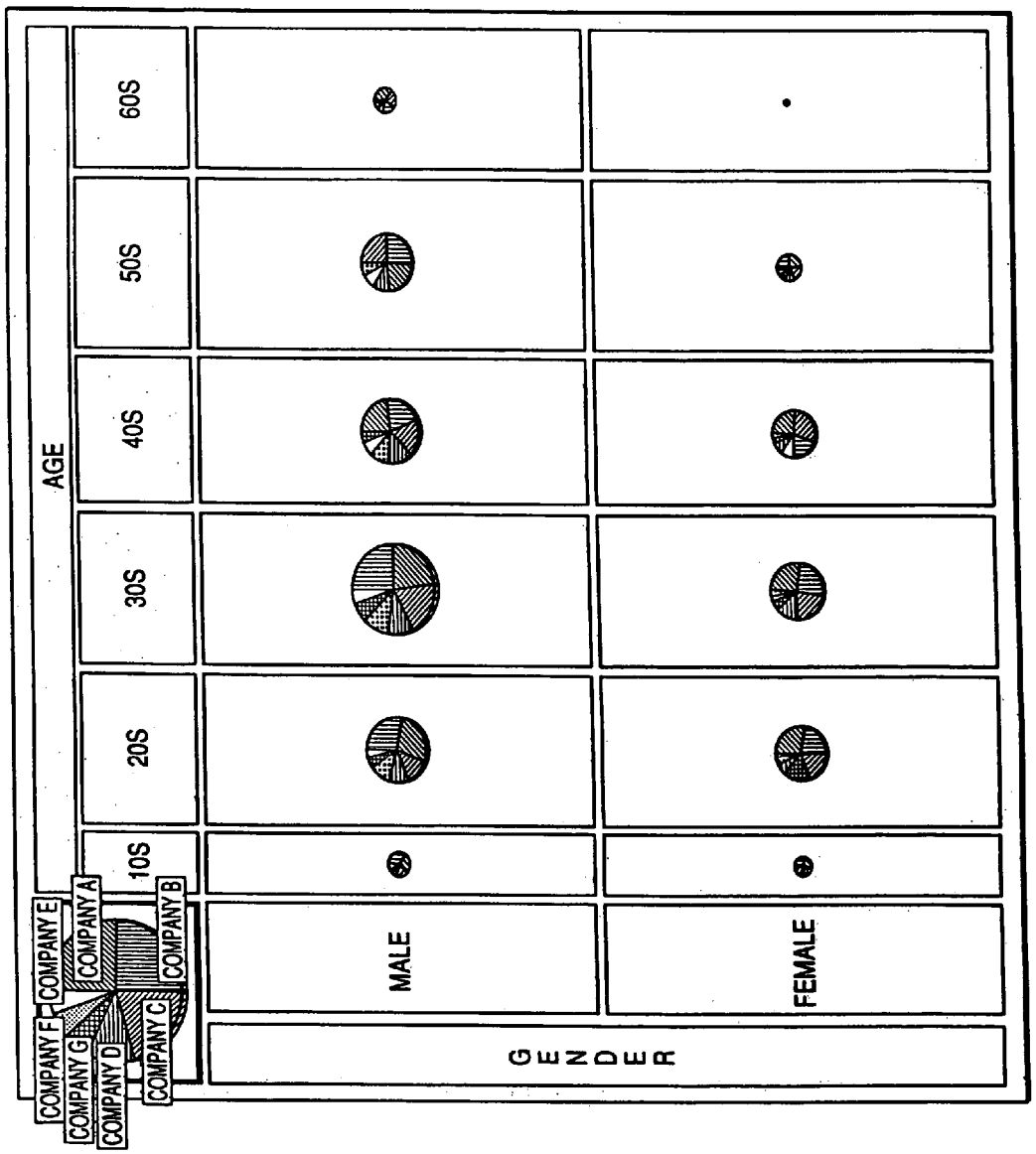
FIG. 1 is a diagram showing a typical example of representation in a method for displaying multidimensional data according to an embodiment of the invention.

Embodiments of the invention will be described below with reference to the drawings. Incidentally, in each drawing, parts the same as those in another drawing are denoted by the same reference numerals correspondingly, and redundant description will be omitted.

First, description will be given on an embodiment of the invention.

FIG. 1 is a view showing an example of representation in a method for displaying a multidimensional data according to the embodiment of the invention. First, what things correspond to axial elements, members, the number of data belonging to each member, and cell regions, will be described with questionnaires by way of example. These questionnaires were sent out to 1,500 males and 1,500 females, for example, whose ages range from teens to sixties, so as to survey them as to whether they wish to purchase personal computers or not. First, axial elements can be regarded as dimensions. "Questions in the questionnaire" (e.g., "what is your age?", or "which is your gender?") can be regarded as data serving as axial elements (age and gender), "answer items" can be regarded as members of each axial element (teens, twenties, etc.), and "the number of persons answering to an answer item" can be regarded as "the number of data belonging to a member". In a combination of two-dimensional axes, each "cell region" can be regarded as a "combination of two members belonging to different axial elements" such as a combination of males in gender and teens in age.

In FIG. 1, three axes of an X-axis (age), a Y axis (gender) and a pattern axis (makers from which persons want to purchase personal computers) are selected from multidimensional data, while X axis members and Y-axis members are arranged orthogonally for table representation. Incidentally, here, the representation of the third dimension is named as a pattern axis because the third dimension is expressed by pattern. The third pattern may be expressed by color. In that case, the representation of the third dimension is named as a color axis. In each cell region corresponding to a combination of the respective members, the number of data classified by the combination of corresponding members of the three axes is graphed by pie chart. In addition, graph representation of pattern-axis members in the multidimensional data as a whole is disposed on the left top of the table representation. In FIG. 1, data about makers from which persons want to purchase personal computers are displayed by pie chart.

The total number of data belonging to display members (members to be displayed actually) is calculated for each axis.

$$\text{weight to be assigned to each display member} = \left( \frac{\text{number of pieces of data belonging to each member}}{\begin{array}{c}\text{total number of pieces of data}\\\text{belonging to display members}\end{array}} \right) \quad (1)$$

The weight to be assigned to each display member is calculated using the expression (1). The size of each member region is calculated on the assumption that the total number of data belonging to the display members corresponds to the total size of the screen. Thus, each member region is displayed on the screen. An expression for obtaining the weight of each display member is not limited to the expression (1), but it may be expression 2 by way of example.

$$\text{weight to be assigned to each display member} = \quad (2)$$
$$\log_{10}\left( \frac{\text{number of pieces of data belonging to each member}}{\begin{array}{c}\text{total number of pieces of data}\\\text{belonging to display members}\end{array}} \right)$$

If the screen is divided evenly in accordance with the number of display members and displayed, numeric values in cell regions have to be confirmed in detail for analyzing data. However, according to the display method of this embodiment, the numeric values can be grasped intuitively at a glance from the areas of the cell regions.

That is, in FIG. 1, one and the same length (width) in Y direction is assigned to males and females as members of gender because each of the numbers of males and females is 1,500. As for the members of age including teens, twenties, thirties, forties, fifties and sixties, it can be grasped at a glance that the number of teens is the smallest, and the number of sixties is the second smallest, while the number of fifties is the largest. In this manner, each cell region divided in accordance with a combination of member regions expresses a set of data satisfying two conditions of an X-axis member (e.g. twenties) and a Y-axis member (e.g. males).

Further, for example, a pie chart arranged in each cell region is a pie chart composed of data of persons corresponding to males in their twenties having "makers from which persons want to purchase personal computers" as the pattern axis.

Incidentally, the display method is influenced by the point of view from which the multidimensional data are analyzed. Accordingly, there may be a difference in meaning and total between a total of each cell, which is a combination of the X-axis and the Y-axis, and a total of each graph arranged in each cell region. For example, males in their twenties include (a) males in their twenties who want to purchase personal computers and (b) males in their twenties who do not want to purchase personal computers. On the other hand, a pie charge arranged in males in their twenties only includes males in their twenties who want to purchase personal computers.

Accordingly, total number of data expressed by area of each cell region and total number of data included in a pie chart arranged in each cell region may be different from each other.

A graph (pie chart in the example of FIG. 1) arranged in each cell region can represent the number of data of each pattern-axis member or the ratio of data of each pattern-axis member with respect to data belonging to a cell having a two-axis combination of an X-axis member and a Y-axis member. Area of the graph represents, of the total number of data belonging to a cell region, the total number of data to be displayed by the pattern axis (the total number of data of display members of the pattern axis).

Accordingly, in order to visualize a difference in the number of data, when the relation (total number of data belonging to each cell region≧total number of data of display members of pattern axis) is established in the ratio of the total number of data belonging to a two-axis combination of an X-axis member and a Y-axis member to the total number of data of members to be displayed by the pattern axis, the area of the graph to be displayed in the cell region can be displayed variably in accordance with this ratio.

In this manner, for example, in customer segment analysis for marketing, the level of consciousness in each cell region (referred to as "segment" in the field of marketing) can be grasped visually. That is, in FIG. 1, it can be grasped easily that the right bottom segment of females in their sixties has a segment size as large as the segment of males in their sixties displayed above the segment of females in their sixties, but has a lower level of consciousness as to purchase of personal computers than the segment of males in their sixties.

When the number of corresponding data, for example, the number of data in the consciousness of females in their sixties as to purchase of personal computers is extremely small, the pie chart arranged in the cell region becomes too small to be recognized visually. In such a case, the minimum size to display each pie chart may be defined in advance in order to make the pie chart easy to recognize visually.

Further, a test as to whether or not features of pattern-axis members can be expressed by cell regions can be performed by means of statistic testing on the graph display frame of each pattern-axis member in the graph of the whole multidimensional data displayed on the left top of the table representation. For example, preferable as the test is an $\chi^2$ test to be used for comparison in frequency or ratio among two or more groups. In this case, when one member is dominant in a five-percent test, it is, for example, expressed by a blue thin graph display frame. When one member is dominant in a one-percent test, it is, for example, expressed by a red thick graph display frame. When a difference in dominance is expressed by a variation of frame thickness or display color in such a manner, visual appeal is enhanced so that it can be determined viscerally whether or not the combination of selected axes is statistically dominant.

Figure 9:
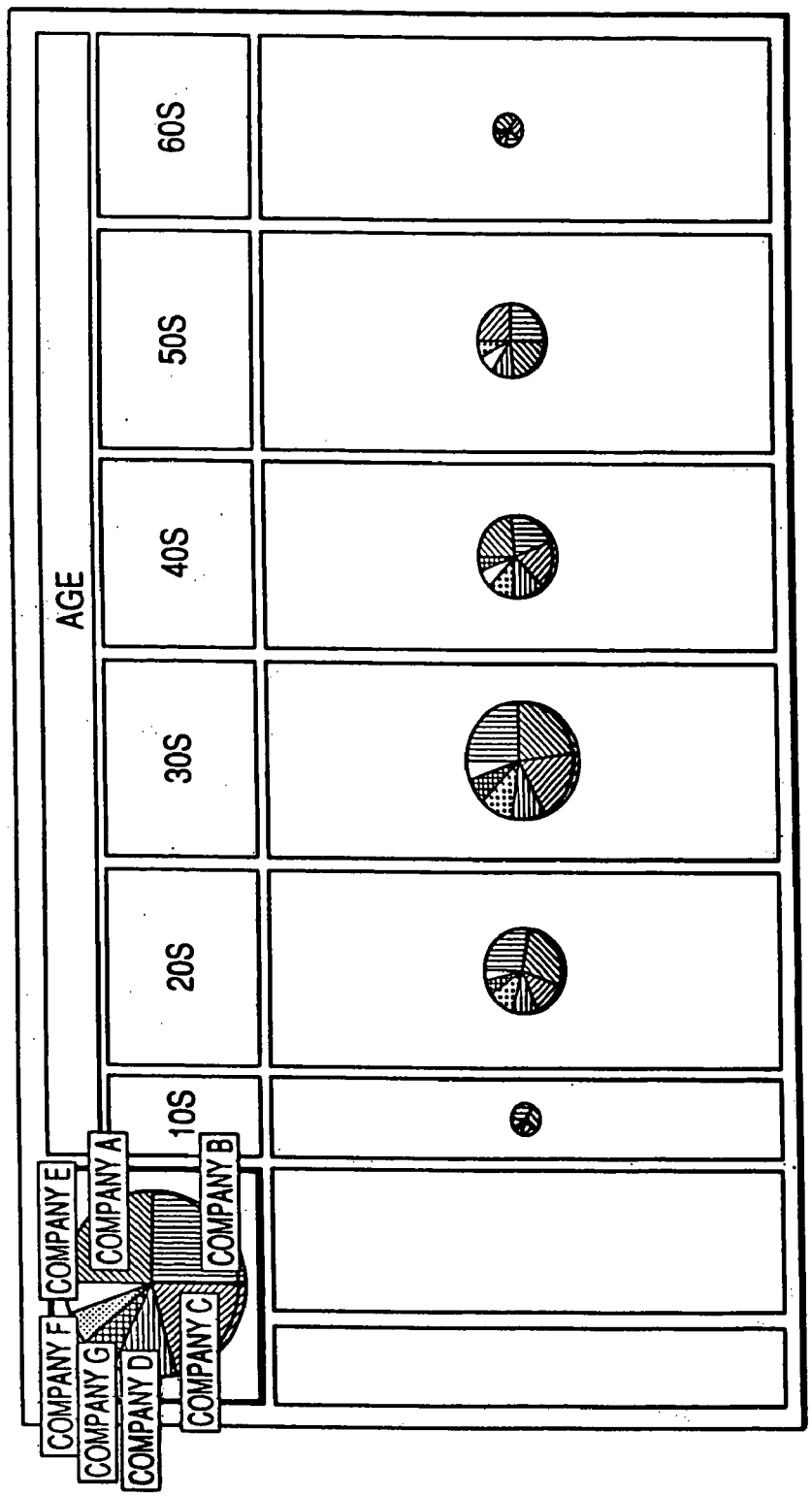
FIG. 9 is a diagram showing another example of representation in a method for displaying multidimensional data according to an embodiment of the invention.

In FIG. 1, three axes of X axis (age), Y axis (gender), and pattern axis (maker from which persons want to purchase personal computers) are selected from multidimensional data. However, two axes may be selected from multidimensional data. For example, X axis (age) and pattern axis (maker from which persons want to purchase personal computers) may be selected from multidimensional data as shown in FIG. 9. In this case, the number of data belonging to each member determines width of each cell region in X direction, and lengths of the cell regions in Y direction are uniform. In other words, the number of data belonging to each member determines area of each cell region.

Figure 2:
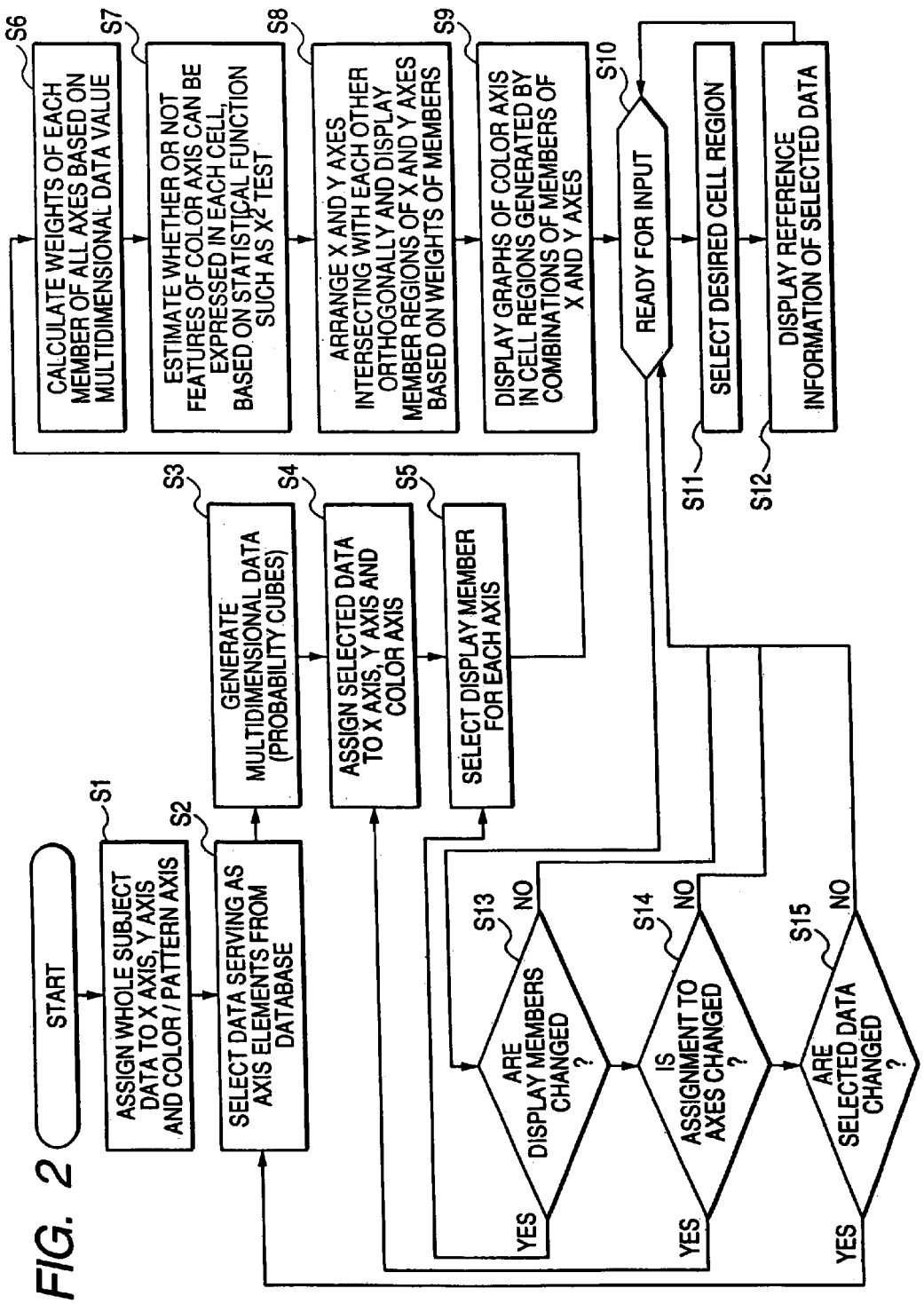
FIG. 2 is a flow chart showing an example of a method for displaying multidimensional data according to an embodiment of the invention.

FIG. 2 is a flow chart showing an example of the method for displaying multidimensional data according to an embodiment of the invention. In FIG. 2, first, as initial setting, the "whole", which is an axial element expressing the whole of multidimensional data, is assigned to displayable axes (Step S1). Here, the displayable axes are an X axis, a Y axis and a pattern axis in FIG. 1 by way of example. The X axis designates age and the Y axis designates gender. The pattern axis is expressed, for example, by white as a background color of a pie chart. Next, desired data serving as axis elements are selected from subject multidimensional data (Step S2). For example, in FIG. 1, data of age are selected for the X axis, data of gender are selected for the Y axis, and data of makers from which persons want to purchase personal computers are selected for the pattern axis. Next, a summary table (probability cubes) of a database is generated to be able to achieve fast access to the data selected in Step S2 (Step S3).

Next, the axis element data selected in Step S2 are assigned to the displayable axes (Step S4). From members assigned to each axis element, members to be displayed actually (display members) are selected (Step S5). For example, in FIG. 1, all the ages of teens, twenties, thirties, forties, fifties and sixties are selected from "age" as members of the X axis. Males and Females of "gender" are selected as members of the Y axis. Incidentally, the order of Step S4 and Step 5 may be reversed.

Next, the total number of data belonging to the display members is calculated for each axis, and weights to be assigned to the display members are calculated, for example, by a function provided by the expression (1) or (2) (Step S6). The function provided by the expression (1) has an effect on the case where a user desires to disregard segments having a small market size in analysis of market segments. The function provided by the logarithmic function of the expression (2) can classify members into respective sizes in order-of-magnitude unit. Thus, the function provided by the logarithmic function of the expression (2) has an effect on visual grasp of the size of each member when a difference in the number of data among the members is large and it is not desired to make each cell region too small.

Next, in Step S7, a statistical test (e.g. $\chi^2$ test) is performed as to whether or not features of pattern-axis members can be expressed by each cell consisting of cell region data of members provided by the X-axis and Y-axis.

Next, the X-axis and the Y-axis are arranged orthogonally, and each region on the screen is calculated in accordance with the weights of members of each axis, so as to display each member region (Step S8).

Next, in Step S9, for example, a bar chart or a pie chart is displayed as numeric values or a graph displayable for each pattern in each cell region, which is a combination of respective members, and a routine of processing is ready for an input from the operator (Step S10).

When a desired cell region is selected (Step S11), reference data are displayed, for example, on a monitor (Step S12), and the routine of processing returns to Step S10. For example, the reference data include an enlarged representation of the pie chart, or a representation of a difference between a ratio of each pattern-axis member to the entire subject multidimensional data and a ratio of the pattern-axis member to the selected cell region.

On the other hand, when the display members are to be changed in Step S10, the routine of processing returns to Step S5 (Step S13). When the assignment of the axes is to be changed, the routine of processing returns to Step S4 (Step S14). When the selected data are to be changed, the routine of processing returns to Step S2 (Step S15).

On-Line Analytical Processing (OLAP) is a technique for retrieving data from a database in accordance with interactive operation of an operator, aggregating the data on the basis of various points of view, and displaying the results of the aggregation. In the OLAP, graph representation etc. as well as cross tabulation are used as representation of data. According to the OLAP, features of data can be tested from various points of view in accordance with user's operation. The OLAP belongs to a method called a "hypothesis testing type".

Here, when the aforementioned flow is associated with operations of the OLAP, a slice operation and a drill operation of the OLAP are included in the changing of display members in Step S13. On the other hand, a dice operation of the OLAP is included in the changing of assignment of axes and the changing of selected data in Step S14 and Step S15.

Figure 3:
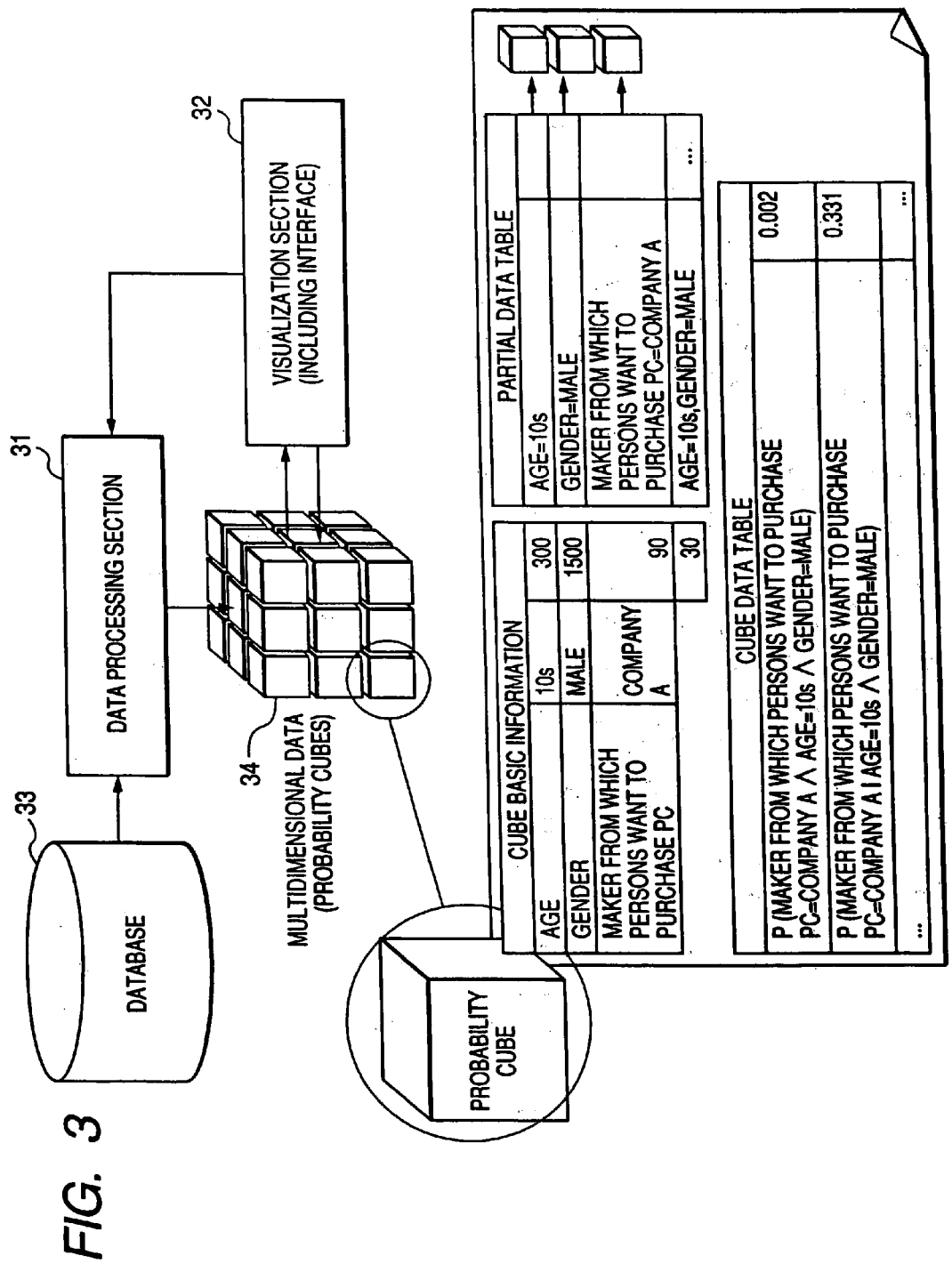
FIG. 3 is an illustration showing a data access method and a probability cube structure using probability cubes in a method for displaying multidimensional data according to an embodiment of the invention.

Next, a data access method and an example of a summary table data structure in the method for displaying multidimensional data according to an embodiment of the invention will be described with reference to FIG. 3. In FIG. 3, a data processing section 31 is connected to a visualization section 32 including an interface, and further connected to a database 33. When an operator operates the visualization section 32 so as to give an instruction to the data processing section 31, the data processing section 31 accesses to a desired data region of the database 33 so as to fetch data and execute a multidimensional data generating process.

Assume that multidimensional data (probability cubes) 34 are generated at the database in Step S3 of FIG. 2. In this case, when a desired probability cube has already existed, this existing probability cube is used. However, when the desired probability cube is absent, the desired probability cube is generated from the database by the data processing section 31, and recorded into a recording medium. In this event, the probability cube may be generated in either an M-OLAP (Multi-dimensional On-line Analytical Processing) format or an R-OLAP (Relational On-line Analytical Processing) format. Incidentally, the M-OALP format is a format in which summary information generated from accumulated data is stored in a multidimensional database on the sever side, and data are cut out and sent in accordance with a process request from a client. On the other hand, the R-OLAP format is a format in which data stored in a relational database on the server side are retrieved and aggregated directly, and a result thereof is arranged and visualized as multidimensional data on the client side.

One probability cube has cube basic information and probability information. The cube basic information holds primitive data forming the cube, such as identifiers indicating axis data, identifiers indicating axis members, the number of data belonging to each axis member, etc. The probability information has a "probability cube table" and a "probability cube reference table". The probability cube table stores combinations the number of which is equal to the number of dimensions of axes assigned to the probability cube. The probability cube reference table stores references to other probability cubes, which are lower in the number of dimensions.

In the case of the example shown in FIG. 3, assume that the number of dimensions is three (age=teens, gender=males, and maker from which persons want to purchase personal computers=company A). Then, in the probability cube table, each record holds information of a character string obtained from an expression where all the members of the three dimensions appear in a conditional probability expression, and a conditional probability value corresponding to the expression. The probability cube table holds all the records of possible combinations. In this example, the probability cube table is constituted by the following seven patterns.

P(maker from which persons want to purchase PCs=company A, age=teens, gender=males|)

P(maker from which persons want to purchase PCs=company A|age=teens, gender=males)

P(age=teens|maker from which persons want to purchase PCs=company A, gender=males)

P(gender=males|age=teens, maker from which persons want to purchase PCs=company A)

P(age=teens, gender=males|maker from which persons want to purchase PCs=company A)

P(maker from which persons want to purchase PCs=company A, gender=males|age=teens)

P(age=teens, maker from which persons want to purchase PCs=company A|gender=males)

P(X|Y) designates a probability of occurrence of the condition X assuming that the condition Y has occurred. The mark "," designates concurrent occurrence. That is, P(X|Y,Z) designates a probability of occurrence of the condition X when both the conditions Y and Z are fulfilled. A null character string on the right side of the mark "|" as in P (X|) designates "no condition (whole)".

On the other hand, the probability cube reference table has references to probability cubes composed of combinations of two dimensions or one dimension. In the example shown in FIG. 3, the following six patterns are present.

age=teens gender=males maker from which persons want to purchase PCs=company A age=teens, gender=males age=teens, maker from which persons want to purchase PCs=company A gender=males, maker from which persons want to purchase PCs=company A Using cubes holding such probability information provides not only speeding up access in the R-OLAP format, but visualizing a prediction result, for example, based on a Bayesian belief network model suitable for predicting next consumption behavior of consumers from immediately preceding consumption behavior of the consumers.

Figure 4:
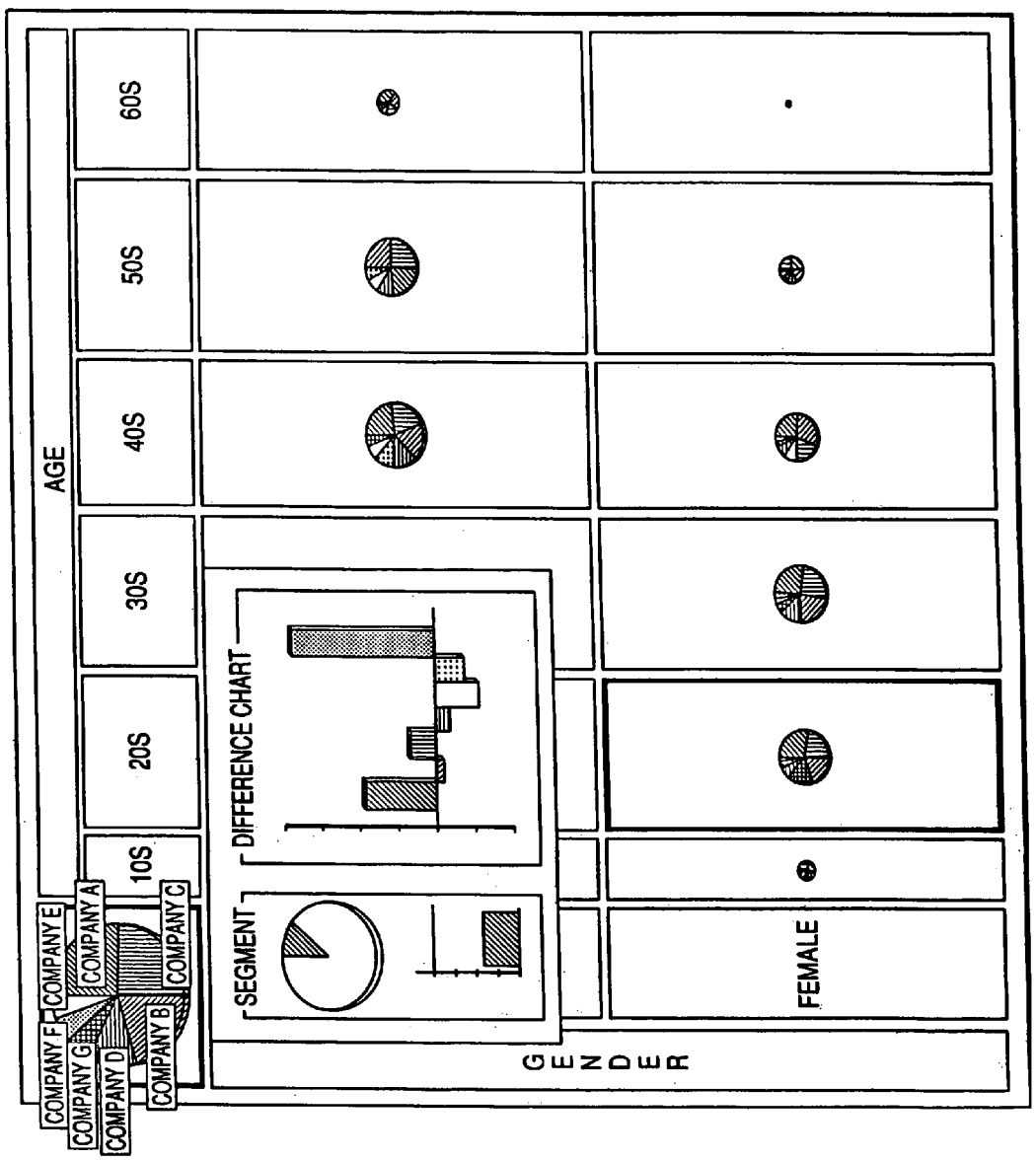
FIG. 4 is a diagram showing an example of representation of reference information in a method for displaying multidimensional data according to an embodiment of the invention.

FIG. 4 is a diagram showing an example of information representation (reference information representation) for comparing data in cell regions with reference data to be compared with the data in the method for displaying multidimensional data according to an embodiment of the invention. This reference representation may be displayed so as to be superimposed on a display screen for displaying the table representation or cell region representation, or may be displayed on another display device. In the example of FIG. 4, a cell of twenties-females has been selected. As the reference information representation, a ratio which can be represented by (total number of data belonging to the selected cell region/total number of data of the subject multidimensional data) and a ratio which can be represented by (total number of data of pattern axis members in the selected cell region/total number of data belonging to the selected cell region) are displayed as a pie chart and a bar chart in a left portion of the reference information representation, respectively. On the other hand, a difference between a ratio of each pattern axis member to the entire subject multidimensional data and a ratio of each pattern axis member to the selected cell is displayed in a right portion of the reference information representation.

In addition, in the difference representation, a drill operation, a slice operation and a dice operation can be performed in the same manner as those in multidimensional data analysis (OLAP). Thus, a point of view of the multidimensional data can be changed in accordance with a request from a user who performs data analysis.

Incidentally, this embodiment deals with difference information between data in the selected cell region and whole data of the subject multidimensional data. However, as information to be displayed, each or a combination of comparison information of the data in the selected cell region with data associated with the data in the selected cell region, such as comparison information of the data in the selected cell region with data in the same cell region surveyed in the past, comparison information the data in the selected cell region with data in cell regions, which are not selected, are displayed.

Figure 5:
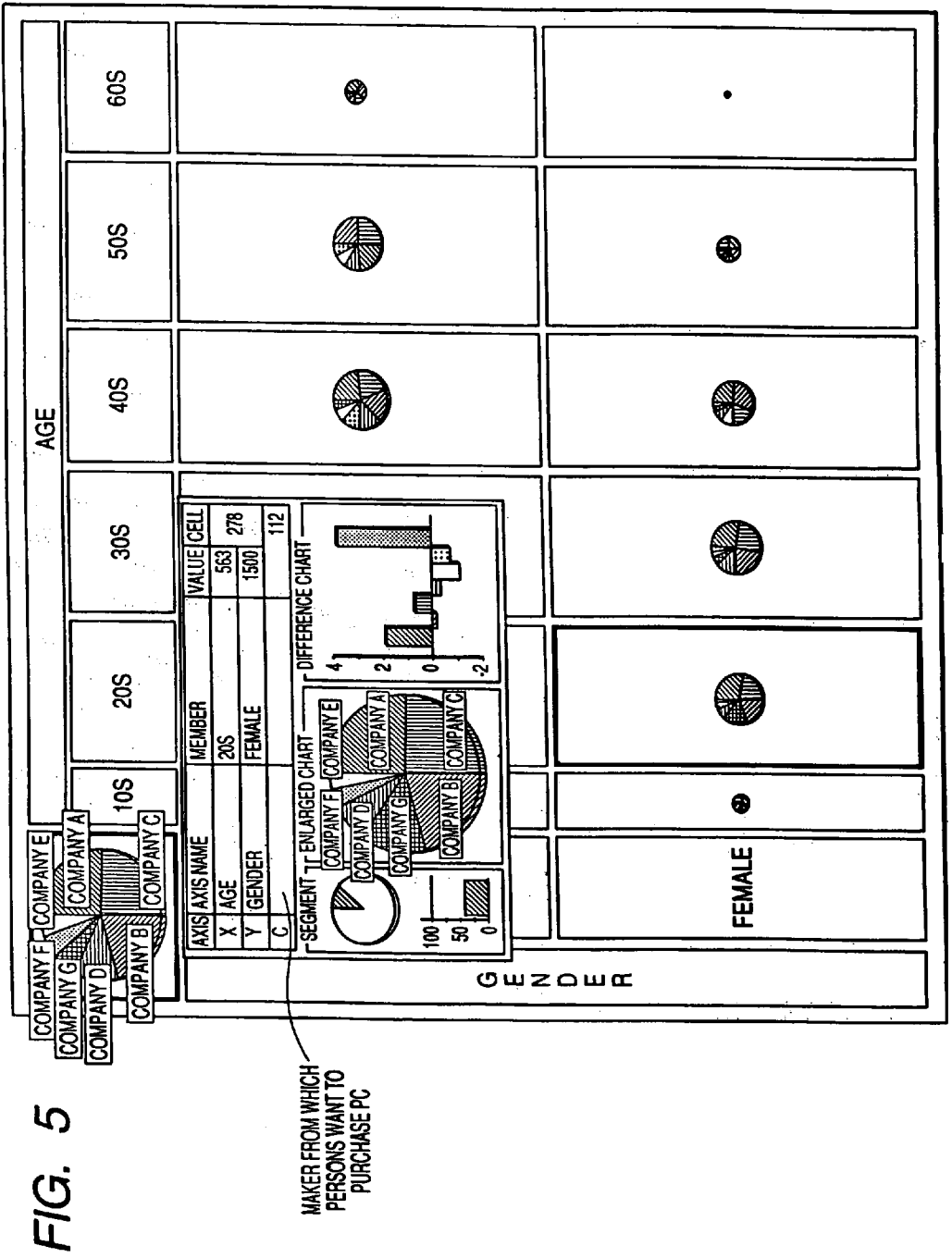
FIG. 5 is a diagram showing an example of representation of reference information in a method for displaying multidimensional data according to an embodiment of the invention.

FIG. 5 is a diagram showing an example of basic information and enlarged representation of a cell region added to information representation for comparing data in a cell region with reference data to be compared with those data in the method for displaying multidimensional data according to an embodiment of the invention. In the example of FIG. 5, the cell basic information is displayed on the top. In this example, the number of data belonging to the member "X axis: twenties" is 563; the number of data belonging to the member "Y axis: females" is 1,500; the number of data belonging to the cell "selected cell: twenties-females" is 278, and the total number of data belonging to display members in the member "pattern axis: maker from which persons want to purchase personal computers" in the cell is 112. A ratio which can be represented by (total number of data belonging to the selected cell region/total number of data of the subject multidimensional data) and a ratio which can be represented by (total number of data of pattern axis members in the selected cell/total number of data belonging to the selected cell region) are displayed as a pie chart and a bar chart in a left bottom portion of the reference information representation, respectively.

On the other hand, an enlarged chart of the selected cell, and a difference chart are displayed in the center bottom of the reference representation and in the right bottom of the reference representation, respectively. In the difference chart, a difference between a ratio of the respective patter-axis members in the entire subject multidimensional data and a ratio of the respective pattern-axis members in the selected cell region is shown.

In the representation of the difference chart, features of the selected cell are brought into bold relief by comparison with other data. For example, when the cell of twenties-females is specified, it can be confirmed that the share of a company G in the right end of the difference chart has increased by a little lower than 4%.

In addition, in the enlarged representation and the difference representation, a drill operation, a slice operation and a dice operation can be performed in the same manner as those in multidimensional data analysis (OLAP). Thus, a point of view of the multidimensional data can be changed in accordance with a request from a user who performs data analysis.

In the same manner as in FIG. 4, this embodiment deals with difference information between data in the selected cell region and whole data of the subject multidimensional data. However, as information to be displayed, each or a combination of comparison information of the data in the selected cell region with data associated with the data in the selected cell region, such as comparison information of the data in the selected cell region with data in the same cell region surveyed in the past, comparison information the data in the selected cell region with data in cell regions, which are not selected, are displayed.

Figure 6:
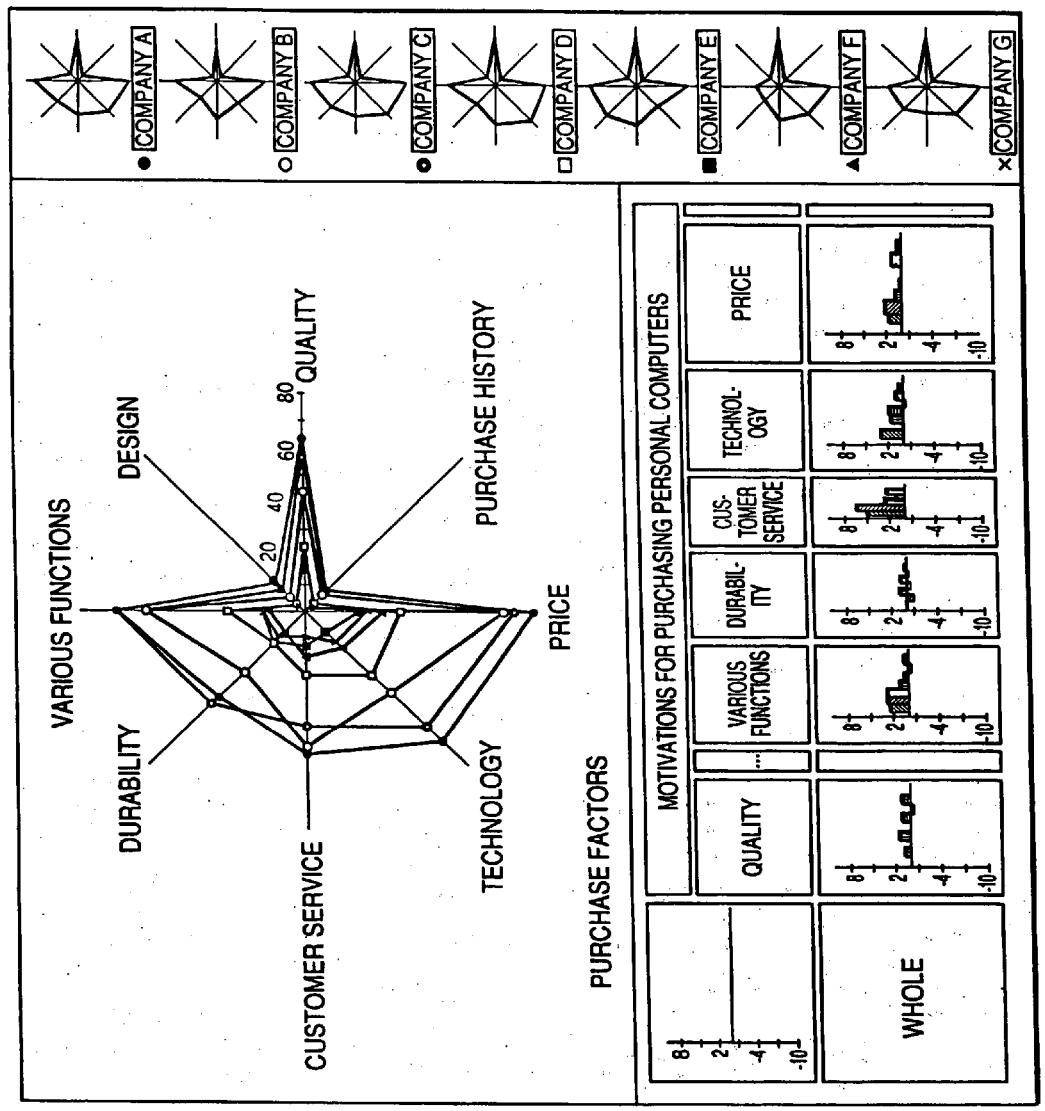
FIG. 6 is a diagram showing an example of data making use of a method for displaying multidimensional data according to an embodiment of the invention.
Figure 7:
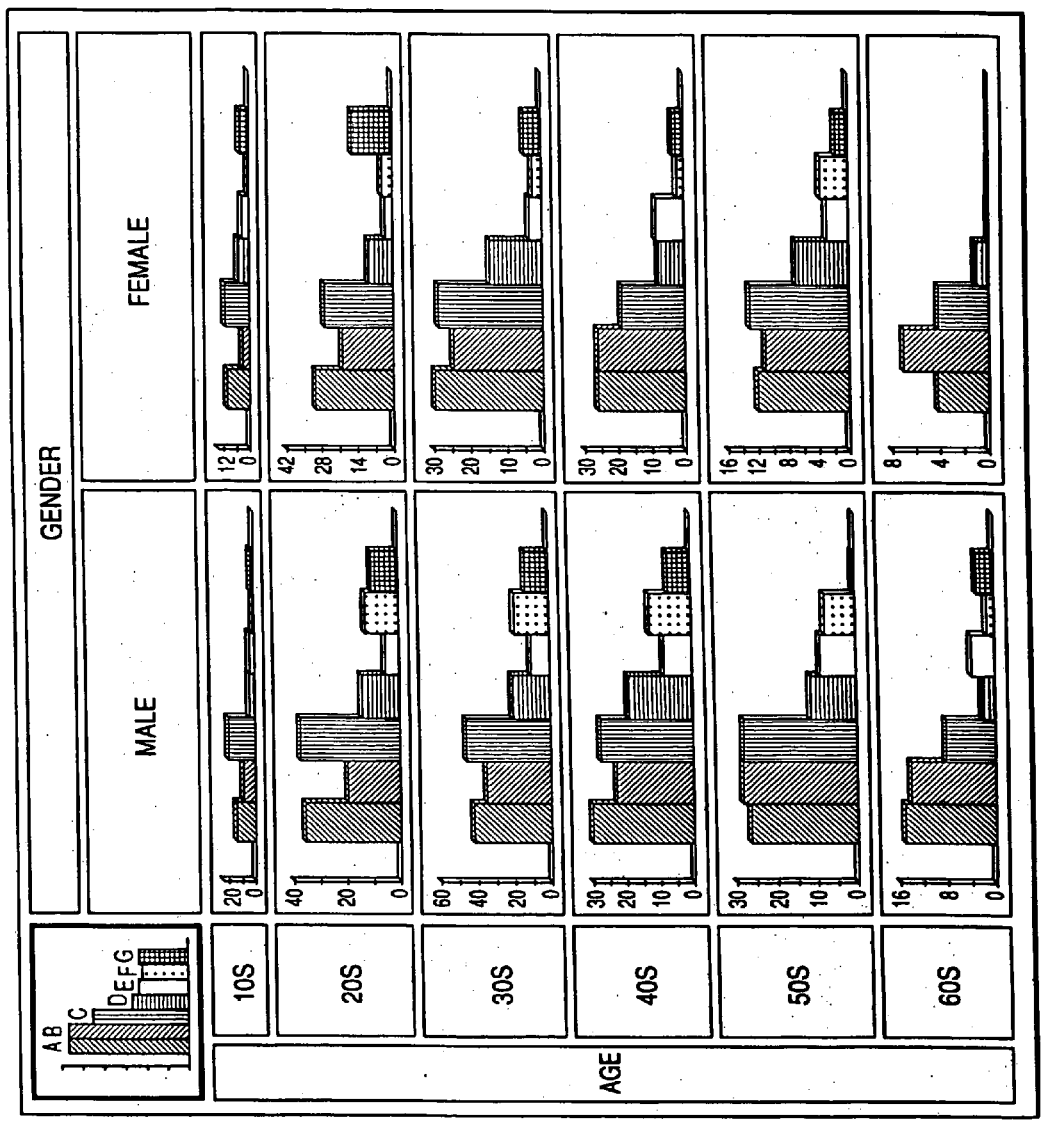
FIG. 7 showing a diagram showing another case of graph representation of cell regions in a method for displaying multidimensional data according to an embodiment of the invention.

The method for displaying multidimensional data according to the embodiments of the invention is not limited to the examples described above. The method for displaying multidimensional data can be combined with another representation form. FIGS. 6 and 7 show cases in which graphs other than pie chars are displayed in the cell regions. FIG. 6 shows an example of representation in which radar chart representation and table representation are combined. From FIG. 6, analysis from the point of view of motivation of purchase of personal computers can be grasped at a glance. That is, it is understood that the price is the ultimate factor of the motives of purchase of personal computers regardless of their makers. On the other hand, as to durability, it is understood that there is a significant difference in weight among the makers. FIG. 7 shows an example where bar charts are displayed in cell regions. From FIG. 7, it can be analyzed that personal computers made by the company A gain support as personal computers that persons want to purchase, regardless of gender and generation.

Figure 8:
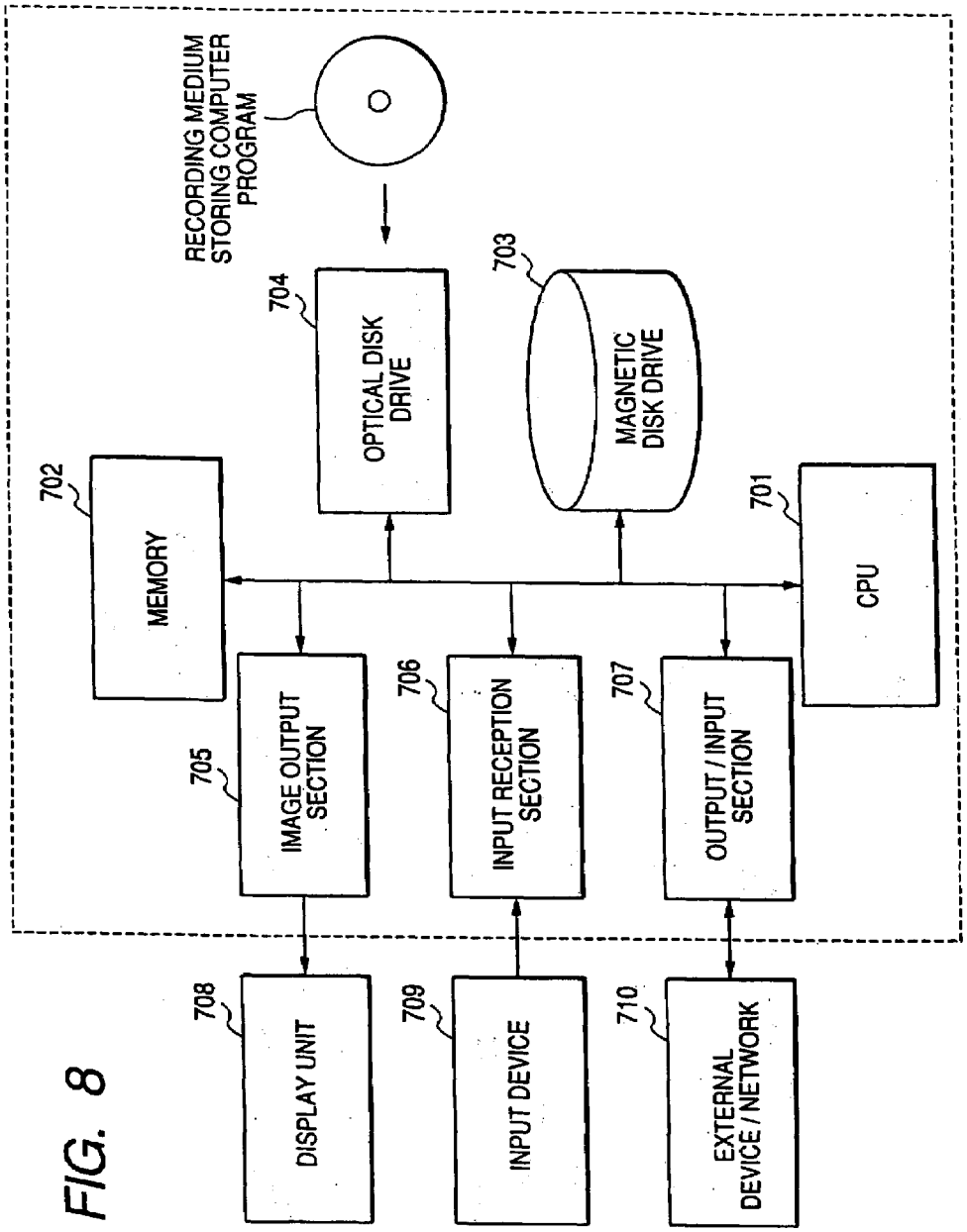
FIG. 8 is a diagram showing an example of hardware when a method for displaying multidimensional data according to an embodiment of the invention is implemented by a computer.

Multidimensional data display apparatus according to the embodiments of the invention can be implemented, for example, on a general computer shown in FIG. 8.

FIG. 8 is a diagram showing an example of hardware when the multidimensional data display apparatus according to one embodiment of the invention is implemented by a computer.

This computer has a central processing unit 701 for executing programs, a memory 702 for storing programs or data being processed by the programs, a magnetic disk drive 703 for storing programs, data to be retrieved and an OS (Operating System), and an optical disk drive 704 for reading/writing programs or data from/into an optical disk.

Further, the computer has an image output section 705 serving as an interface for displaying a screen on a display or the like, an input reception section 706 for receiving an input from a keyboard, a mouse, a touch panel, etc., and an output/input section 707 serving as an output/input interface (e.g. USB (Universal Serial Bus) with an external device, and a voice output terminal etc.). In addition, the computer has a display unit 708 such as an LCD, a CRT, a projector, etc., an input device 709 such as a keyboard, mouse, etc., and an external device 710 such as a memory card reader and a speaker. The external device 710 may be not equipment but a network.

The central processing unit 701 reads a program from the magnetic disk drive 703 or the optical disk drive 704, and stores the program into the memory 702. After that, the central processing unit 701 executes the program so as to obtain the respective functions shown in FIG. 1. During execution of the program, a part or all of data to be retrieved may be read from the magnetic disk drive 703 and stored into the memory 702.

As the basic operation, a retrieval request from the user is received through the input device 709, and to-be-retrieved data stored in the magnetic disk drive 703 or the memory 702 are retrieved in accordance the retrieval request. Then, the result of the retrieval is displayed on the display unit 708.

The result of the retrieval may be not only displayed on the display unit 708 but also presented to the user by voice, for example, through a speaker connected as the external device 710. Alternatively, the result of the retrieval may be presented as a print through a printer connected as the external device 710.

Incidentally, the invention is not limited to the aforementioned embodiments directly. The invention can be implemented by constituent components modified without departing from the gist of the invention in the execution phase thereof. In addition, various inventions can be formed by desired combinations of a plurality of constituent parts disclosed in the aforementioned embodiments. For example, some constituent parts may be deleted from the whole constituent parts shown in the embodiments. Further, constituent parts in different embodiments may be combined suitably.

What is claimed is:

1. A computer-readable medium encoded with a multidimensional data display program causing a computer controlling a display device to execute a process comprising:

assigning a first dimension element, having been selected by a user from among the multidimensional data, to an axis;

giving weights to a plurality of member regions using a function expressed by $$f\left(\frac{n}{N}\right),$$

where n represents number of data belonging to each member of the first dimension element and N represents number of data belonging to the first dimension element;

defining the weighted member regions as a plurality of regions on the axis, which are partitioned for the respective members of the first dimension element;

arranging the weighted member regions within the screen to form a table; and displaying, in each cell region corresponding to the weighted member region, data belonging to each cell region and belonging to a second dimension element having been selected by the user from among the multidimensional data, the second dimension element being different from the first dimension element.

2. The program according to claim 1, the process further comprising:

displaying information on the display, the information indicating a result of comparing data belonging to a cell region having been selected by the user, with reference data.

* * * * *